US011812805B2

(12) United States Patent
Lindqvist

(10) Patent No.: US 11,812,805 B2
(45) Date of Patent: Nov. 14, 2023

(54) ARTICLE OF APPAREL AND RELATED MANUFACTURING METHODS

(71) Applicant: PUMA SE, Herzogenaurach (DE)

(72) Inventor: Rickard Lindqvist, Gothenburg (SE)

(73) Assignee: PUMA SE, Herzogenaurach (DE)

( * ) Notice: Subject to any disclaimer, the term of this patent is extended or adjusted under 35 U.S.C. 154(b) by 692 days.

(21) Appl. No.: 16/884,734

(22) Filed: May 27, 2020

(65) Prior Publication Data

US 2021/0368898 A1  Dec. 2, 2021

(51) Int. Cl.
| | |
|---|---|
| *A41D 27/10* | (2006.01) |
| *A41D 31/02* | (2019.01) |
| *B32B 5/02* | (2006.01) |
| *D04B 1/24* | (2006.01) |
| *A41D 27/24* | (2006.01) |
| *A41B 1/00* | (2006.01) |

(52) U.S. Cl.
CPC .............. *A41D 27/10* (2013.01); *A41B 1/00* (2013.01); *A41D 27/24* (2013.01); *A41D 31/02* (2013.01); *B32B 5/022* (2013.01); *D04B 1/246* (2013.01); *B32B 2437/00* (2013.01)

(58) Field of Classification Search
CPC .... A41D 27/24; A41D 2300/50; A41D 27/10; A41B 1/08; A41B 1/10; A41B 2300/35; D04B 1/246
USPC .......................................................... 2/275
See application file for complete search history.

(56) References Cited

U.S. PATENT DOCUMENTS

| | | | |
|---|---|---|---|
| 294,637 A | 3/1884 | Kreisel | |
| 404,229 A | 5/1889 | Scott | |
| 412,055 A | 10/1889 | Williams | |
| 1,202,332 A * | 10/1916 | Tschirgi | A41D 1/04 2/115 |
| 1,890,385 A * | 12/1932 | Karahadian | A41D 1/04 2/90 |
| 2,072,050 A * | 2/1937 | Sharps | A41D 1/04 2/90 |
| 2,642,570 A | 6/1953 | Heilbronner | |
| 2,911,648 A | 11/1959 | Schanda-seyferth | |
| 3,561,009 A | 2/1971 | Huggins | |
| 3,664,156 A | 5/1972 | Betts | |
| 3,675,604 A | 7/1972 | Frost | |
| 3,719,955 A | 3/1973 | Hrubecky | |
| 4,095,441 A | 6/1978 | Robinson et al. | |
| 4,608,719 A | 9/1986 | Lunt | |
| 4,635,301 A * | 1/1987 | Sulser | A41D 1/00 2/105 |
| 4,649,573 A | 3/1987 | Yen | |

(Continued)

OTHER PUBLICATIONS

International Search Report and Written Opinion of the International Searching Authority from corresponding PCT Application No. PCT/IB2021/053956 dated Aug. 12, 2021 (13 pages).

*Primary Examiner* — Aiying Zhao
(74) *Attorney, Agent, or Firm* — Quarles & Brady LLP

(57) ABSTRACT

A method for manufacturing an article of apparel from a fabric material includes forming a single textile element of fabric material, providing a plurality of cuts to the single textile element, folding the single textile element into an article of apparel, and sewing the article of apparel together along a single continuous stitching line. The textile element is tubular, and the single continuous stitching line encloses a back of the article of apparel.

20 Claims, 12 Drawing Sheets

(56) References Cited

U.S. PATENT DOCUMENTS

| | | | |
|---|---|---|---|
| 4,852,187 A | 8/1989 | Johansson | |
| 5,774,892 A * | 7/1998 | Tisdale | A41D 15/00 2/69 |
| 6,330,814 B1 * | 12/2001 | Fujiwara | D04B 1/246 66/8 |
| 6,389,850 B1 | 5/2002 | Fujiwara | |
| 6,550,287 B1 | 4/2003 | Sherrill | |
| 10,100,445 B2 | 10/2018 | Turner | |
| 10,480,109 B2 | 11/2019 | Turner | |
| 2005/0115281 A1 * | 6/2005 | Mitchell | A41B 9/06 66/176 |
| 2010/0199406 A1 | 8/2010 | Dua et al. | |
| 2015/0284885 A1 | 10/2015 | Turner | |
| 2016/0262474 A1 | 9/2016 | Inzer | |
| 2018/0249777 A1 * | 9/2018 | Turner | A41D 31/02 |
| 2018/0255852 A1 * | 9/2018 | Pilipenka | A41D 27/10 |

* cited by examiner

ARTICLE OF APPAREL AND RELATED MANUFACTURING METHODS

CROSS REFERENCE TO RELATED APPLICATIONS

Not applicable

REFERENCE REGARDING FEDERALLY SPONSORED RESEARCH OR DEVELOPMENT

Not applicable

SEQUENCE LISTING

Not applicable

BACKGROUND

1. Field of the Disclosure

The present disclosure relates generally to clothing, and more particularly, to an article of apparel with a single seam and related manufacturing methods.

2. Description of the Background

Many conventional garments or other articles of apparel generally are formed from textiles of various materials. In a conventional garment process, a garment is formed by attaching, i.e., sewing, different sections or panels to each other. As such, conventional garments often include a plurality of seams or joints that connect the different sections or panels of the garment together. Each seam and/or joint may incrementally increase the cost of manufacturing a garment and may also create issues with the fit, durability, and comfort (chafing). Seams and/or joints may also introduce inconsistencies across a product line when attempting to mass-produce the garment. Further, each seam can increase the production time needed to produce the article of apparel. Specifically, since the seams need to be sewn on the garment by hand or machine, seams add extra time to the production of the article of apparel.

Furthermore, many conventional garments or articles of apparel create a high amount of waste after the production has been completed. For example, traditional T-shirts use only 85% of the fabric necessary to produce each T-shirt. Therefore, 15% of the total fabric necessary to produce each T-shirt is wasted on completion of the T-shirt. Over time, this waste can add up to substantial monetary losses and create environmental impacts.

Therefore, a method for manufacturing an article of apparel having minimal seams and producing less waste is desired. These and other deficiencies with the prior art are outlined in the following disclosure.

SUMMARY

A number of advantages of an article of apparel or garment and a method for manufacturing the article of apparel described herein will be apparent to those having ordinary skill in the art. For example, the garment can be formed from a single textile element, which can provide cost savings during production. Further, as much as 90% or greater, preferably 99% or greater, and more preferably 99.9% or greater of fabric material from the textile element can be used to form the garment, which can additionally provide cost savings and a positive impact on the environment. Still further, the inclusion of a single continuous stitching line described herein can provide a single seam to form the garment, which can decrease the time necessary to produce the garment. Furthermore, the specific placement of a plurality of cut lines described herein allow for reduced cutting during the production of the garment, which can also decrease production time and increase efficiency. The various elements and processes of producing the articles of apparel described herein add varying economic and environmental benefits.

In one aspect of the present disclosure, a method for manufacturing an article of apparel from a fabric material is provided. The method includes the steps of forming a single textile element of fabric material, and providing a plurality of cuts to the textile element. The single textile element is tubular. The method also includes the step of folding the single textile element into an article of apparel. The method further includes the step of sewing the article of apparel together along a single continuous stitching line. The single continuous stitching line encloses a back of the article of apparel.

In some embodiments, the method further comprises a step of adding a graphic to the article of apparel. In other embodiments, the plurality of cuts remove 10% or less of the fabric material from the single textile element. In further embodiments, the article of apparel is a garment for an upper body of the wearer, and the garment includes a first arm sleeve, a second arm sleeve, a front, and a back. The single continuous stitching line is positioned on the first arm sleeve and the back of the garment. In different embodiments, the single continuous stitching line extends from the first arm sleeve to the second arm sleeve. In some embodiments, the single continuous stitching line is sewn in an S-shaped configuration. In further embodiments, the single continuous stitching line comprises a wave pattern. In different embodiments, the method further comprises the step of adding one or more tubular sleeves to the article of apparel. In other embodiments, multiple articles of apparel are formed from the single textile element. At least one of the plurality of cuts to the article of apparel precuts a portion of a subsequent article of apparel.

In another aspect of the present disclosure, a method of manufacturing a garment from a fabric material is provided. The method includes the steps of providing a single textile structure of a fabric material having a predetermined length and diameter, and providing a plurality of cuts to the fabric material of the single textile structure. The single textile structure is tubular. The method also includes the steps of unfolding the single textile structure into a T-shape, and folding an upper portion of the single textile structure along a center folding axis to form a garment. The method further includes the step of sewing an edge of the upper portion of the single textile structure along a continuous stitching line. The continuous stitching line encloses a back of the garment, and the continuous stitching line is the only seam to form the garment.

In some embodiments, the method further comprises the step of adding a graphic to the article of apparel. In other embodiments, the single continuous stitching line comprises a wave pattern. In further embodiments, the article of apparel is a garment for an upper body of a wearer. In different embodiments, the garment comprises a torso opening, a neck opening, and two armholes. The torso opening, the neck opening, and the two armholes are the only openings in the garment that lead to the interior portion of the garment.

In yet another aspect of the present disclosure, a method for manufacturing an article of apparel is provided. The method includes the steps of forming a first flat textile structure and forming a second flat textile structure. The method also includes the steps of forming a tubular textile structure from the first flat textile structure and the second flat textile structure, and providing a plurality of cuts to the tubular textile structure. The method further includes the steps of unfolding the tubular textile structure into a T-shape, and folding an upper portion of the tubular textile structure along a center folding axis to form an article of apparel. Additionally, the method includes sewing an edge of the upper portion of the tubular textile structure along a continuous stitching line. The continuous stitching line encloses a back of the article of apparel. The continuous stitching line also is the only seam added to form the article of apparel after the tubular textile structure has been formed.

In some embodiments, the method further comprises the step of adding a graphic to the article of apparel. In other embodiments, the single continuous stitching line is sewn in an S-shaped configuration.

Other aspects of the method for manufacturing the articles of apparel described herein, including features and advantages thereof, will become apparent to one of ordinary skill in the art upon examination of the figures and detailed description herein. Therefore, all such aspects of the method for manufacturing the articles of apparel are intended to be included in the detailed description and this summary.

DETAILED DESCRIPTION OF THE DRAWINGS

Figure 1:
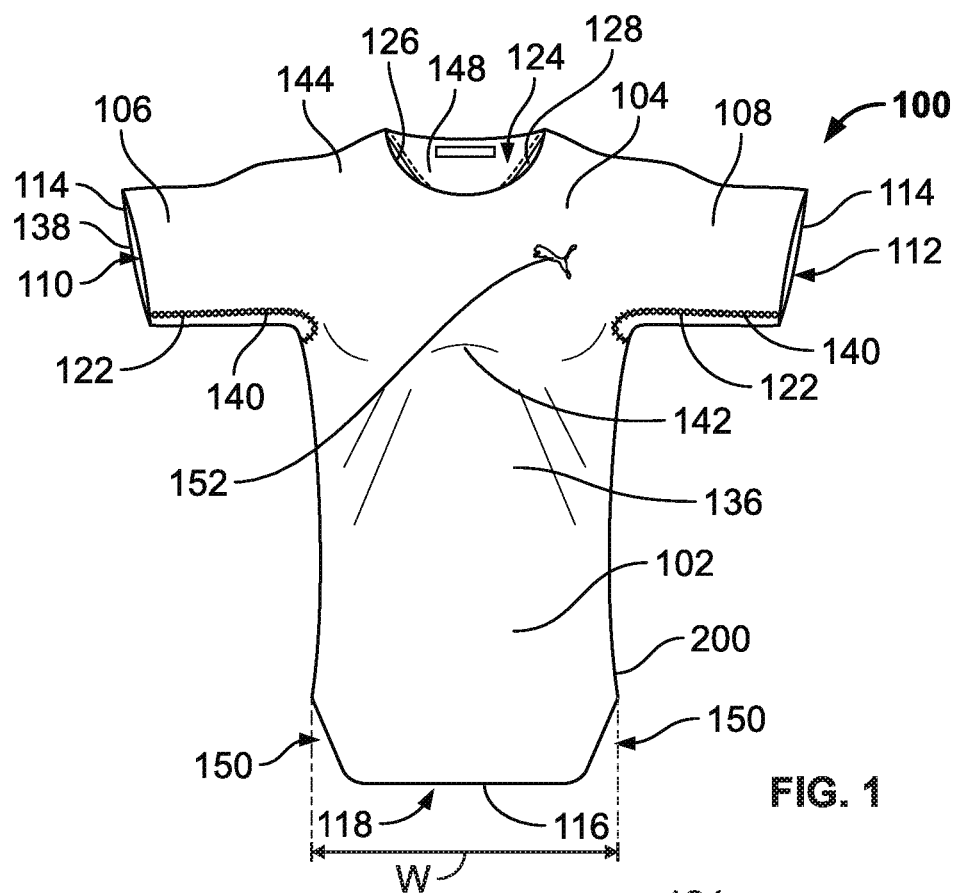
FIG. 1 is a front view of an article of apparel configured as a garment, according to an embodiment of the present disclosure.

The following discussion and accompanying figures disclose various embodiments or configurations of a garment or article of apparel and a method for manufacturing the garment or the article of apparel. Although embodiments are disclosed with reference to a garment, such as a T-shirt, concepts associated with embodiments of the garment may be applied to a wide range of apparel, including long sleeve shirts, sweaters, pullovers, and coats, for example.

The term "about," as used herein, refers to variations in the numerical quantity that may occur, for example, through typical measuring and manufacturing procedures used for articles of apparel or other articles of manufacture that may include embodiments of the disclosure herein; through inadvertent error in these procedures; through differences in the manufacture, source, or purity of the ingredients used to make the compositions or mixtures or carry out the methods; and the like. Throughout the disclosure, the terms "about" and "approximately" refer to a range of values ±5% of the numeric value that the term precedes.

The present disclosure is directed to an article of apparel, such as a garment for an upper body of a wearer. The article of apparel may comprise a knitted component, a woven textile, a non-woven textile, leather, mesh, suede, or a combination of one or more of the aforementioned materials. The knitted component may be made by knitting of yarn, the woven textile by weaving of yarn, and the non-woven textile by manufacture of a unitary non-woven web. Knitted textiles include textiles formed by way of warp knitting, weft knitting, flat knitting, circular knitting, or other suitable knitting operations. The knit textile may have a plain knit structure, a mesh knit structure, or a rib knit structure, for example. Woven textiles include, but are not limited to, textiles formed by way of any of the numerous weave forms, such as plain weave, twill weave, satin weave, dobbin weave, jacquard weave, double weaves, or double cloth weaves, for example. Non-woven textiles include textiles made by air-laid or spun-laid methods, for example. The garment may comprise a variety of materials, such as a first yarn, a second yarn, or a third yarn, which may have varying properties or varying visual characteristics.

As explained herein, the present disclosure provides a process for forming textile articles of apparel. In preferred embodiments, the articles of apparel are produced from a circularly formed textile in order to form a garment with a single interior seam or joint. To that extent, an interior seam refers to seams running in or through the garment, as opposed to hems that run along exterior edges of the garment. As noted herein, the elements in FIGS. 1-12 and 14 comprise a fabric material. However, in order to help illustrate the figures with greater clarity, FIGS. 5, 7, 12, and 14 comprise a gray scale background to help illustrate the fabric material with respect to the background of the page.

Figure 2:
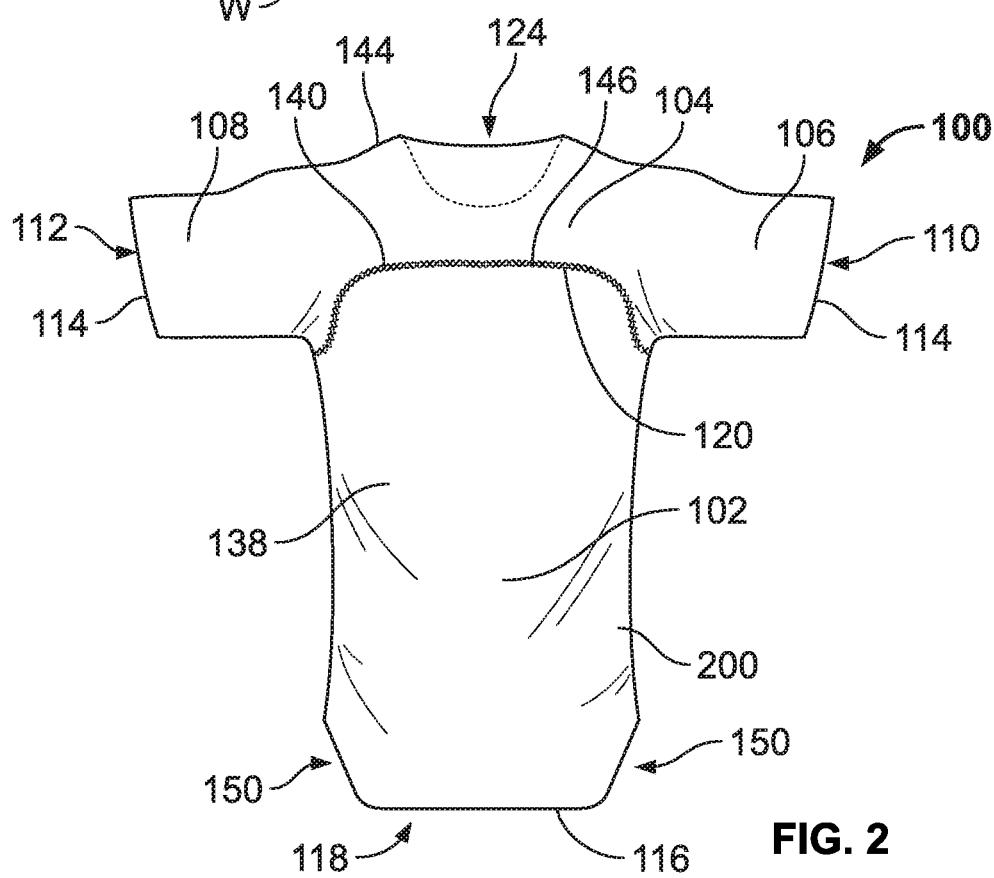
FIG. 2 is a rear view of the garment of FIG. 1.

FIGS. 1-4 depict an exemplary embodiment of an article of apparel configured as a garment 100. As illustrated in FIGS. 1 and 2, a front view and a rear view of the garment 100 are shown, respectfully. The garment 100 includes a lower torso portion 102 and an upper chest or yoke portion 104 defining a right or first arm sleeve 106 and a left or second arm sleeve 108. The sleeves 106, 108 extend from the yoke portion 104 and form two armholes 110, 112 at the distal ends 114 of the arm sleeves 106, 108, respectfully. With reference to FIG. 2, the torso portion 102 extends from a bottom hem or end 116 that defines a torso opening 118 to a back top edge 120 positioned adjacent to a bottom edge 122 (see FIG. 1) of the first and second arm sleeves 106, 108. Put differently, the torso portion 102 defines a waist dimension W of the garment 100 (see FIG. 1), and the yoke portion 104 defines a chest dimension C of the garment 100 (see FIG. 3). As further illustrated in FIG. 1, the yoke portion 104 also defines a neck opening 124 that is bordered by a collar or hem 126. The torso opening 118, the neck opening 124, and the two armholes 110, 112 lead to an interior portion 128 of the garment 100. In preferred embodiments, the torso opening 118, the neck opening 124, and the two armholes 110, 112 are the only openings in the garment 100 that lead to the interior portion 128 of the garment 100.

Referring to FIGS. 1 and 2, the torso portion 102, the chest or yoke portion 104, and the sleeves 106, 108 define a front 136 (see FIG. 1) and a back 138 (see FIG. 2) of the garment 100. In alternative embodiments, the garment 100 may have different colors, textures, or fabrics. The entire garment 100 is formed from a single piece of material (see textile element 200 in FIG. 5) and a single continuous stitching line 140. In preferred embodiments, the single continuous stitching line 140 is the only interior seam used to form the garment 100. As illustrated in FIGS. 1 and 2, the continuous stitching line 140 is positioned on the front 136 (see FIG. 1) and the back 138 (see FIG. 2) of the garment 100, and the continuous stitching line 140 extends from the armhole 110 of the first arm sleeve 106 to the armhole 112 of the second arm sleeve 108. Further, the continuous stitching line 140 extends between the torso portion 102 and the yoke portion 104 on the back 138 of the garment 100 (see FIG. 2). In this embodiment, the continuous stitching line 140 comprises a wave pattern, however, in alternative embodiments, the continuous stitching line 140 may comprise any type of pattern on the garment 100.

Figure 3:
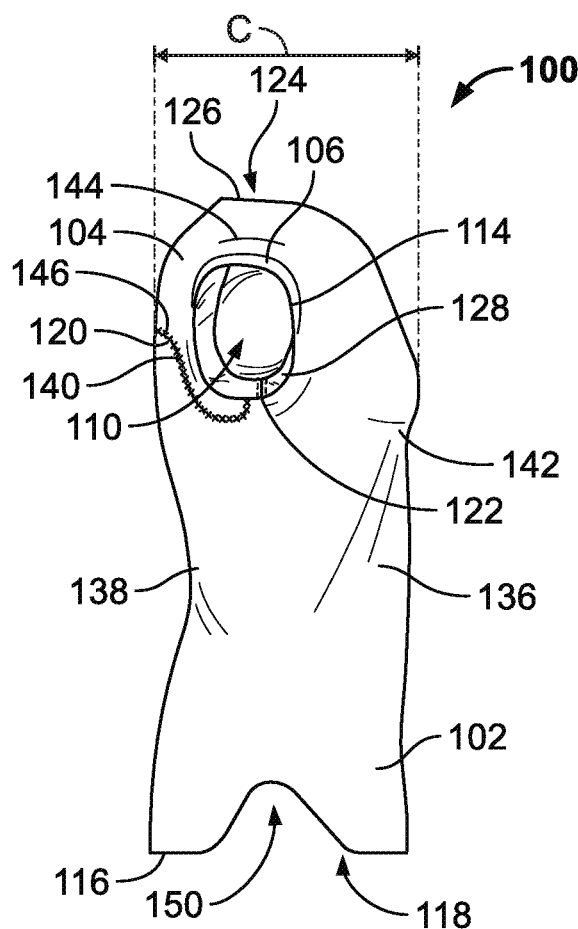
FIG. 3 is a right side view of the garment of FIGS. 1 and 2.
Figure 4:
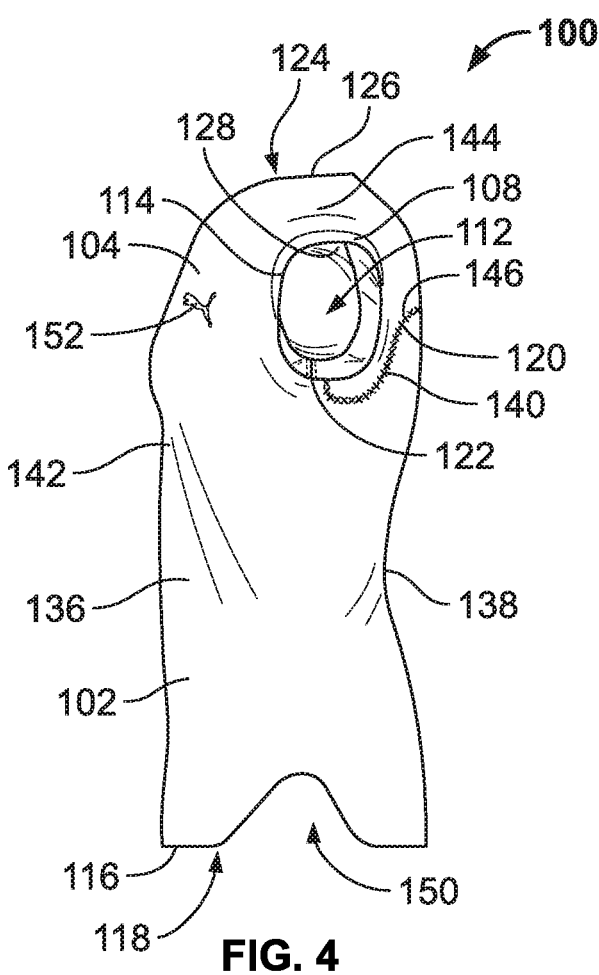
FIG. 4 is a left side view of the garment of FIGS. 1-3.

Referring to FIGS. 1, 3 and 4, the yoke portion 104 of the garment 100 extends upwards from a front top area 142 of the torso portion 102 at the front 136 of the garment 100. With reference to FIGS. 2, 3, and 4, the yoke portion 104 then extends over a shoulder portion 144 of the garment 100 and back down the back 138 of the garment 100 until reaching the continuous stitching line 140. As such, the continuous stitching line 140 is used to couple a free edge 146 of the yoke portion 104 to the back top edge 120 of the torso portion 102 at the back 138 of the garment 100. In alternative embodiments, the yoke portion 104 may be larger or smaller than shown. Further, depending on the size dimensions of the garment 100, the torso portion 102 may be increased or decreased. As illustrated in FIG. 1, the interior portion 128 of the garment 100 may include a flap 148 of fabric attached thereto. As will be discussed in further details herein, the flap 148 produces the neck opening 124 in the garment 100 and may include a logo or tag thereon. In some embodiments, the garment 100 may include a pocket attached to the yoke portion 104 and/or the torso portion 102.

Referring to FIGS. 3 and 4, a right side view and a left side view of the garment 100 are shown, respectfully. As illustrated in FIGS. 3 and 4, the bottom end 116 of the torso portion 102 includes lateral hip cutouts 150 positioned on both sides of the garment 100. The lateral hip cutouts 150 allow for more stretch in the garment 100 which results in a more comfortable fit for a wearer of the garment 100. As will be discussed in further details herein, the lateral hip cutouts 150 are cut in such a configuration/shape to allow the garment 100 to be configured from a single tubular material (see textile element 200 in FIG. 5). Further, the lateral hip cutouts 150 allow the garment 100 to be formed by a more efficient process (see FIG. 12). As illustrated in FIGS. 1 and 4, the garment 100 includes a logo 152. In alternative embodiments, the garment 100 may include one or more of logos, graphics, iconography, and text positioned throughout the garment 100. Additionally, different types of patterns may be printed or attached to the garment 100 after it has formed. It is contemplated that the garment 100 may comprise any number or type of iconography and/or text thereon.

Referring to FIGS. 1 and 2, the sleeves 106, 108 of the garment 100 may include hemming at the distal ends 114 that form the armholes 110, 112. Further, in some embodiments, the sleeves 106, 108 of the garment 100 may include a cuff (not shown). For instance, a portion of the sleeves 106, 108, may be folded back along a fold line 154 (see FIG. 7) to form a cuff in the sleeves 106, 108. The cuff in the sleeves 106, 108, may help to reinforce the sleeves 106, 108 and/or may be decorative. As such, the sleeves 106, 108 may be shortened by folding the sleeves 106, 108 along the fold line 154 (see FIG. 7). Although the garment 100 is depicted as a T-shirt or shirt, it is contemplated that the garment 100 may comprise any article of apparel for an upper body of the wearer. For example, the garment 100 may be a long sleeve shirt, a sweater, a pullover, coat, etc. Further, in alternative embodiments, the size and dimensions of the garment 100 may vary.

Figure 5:
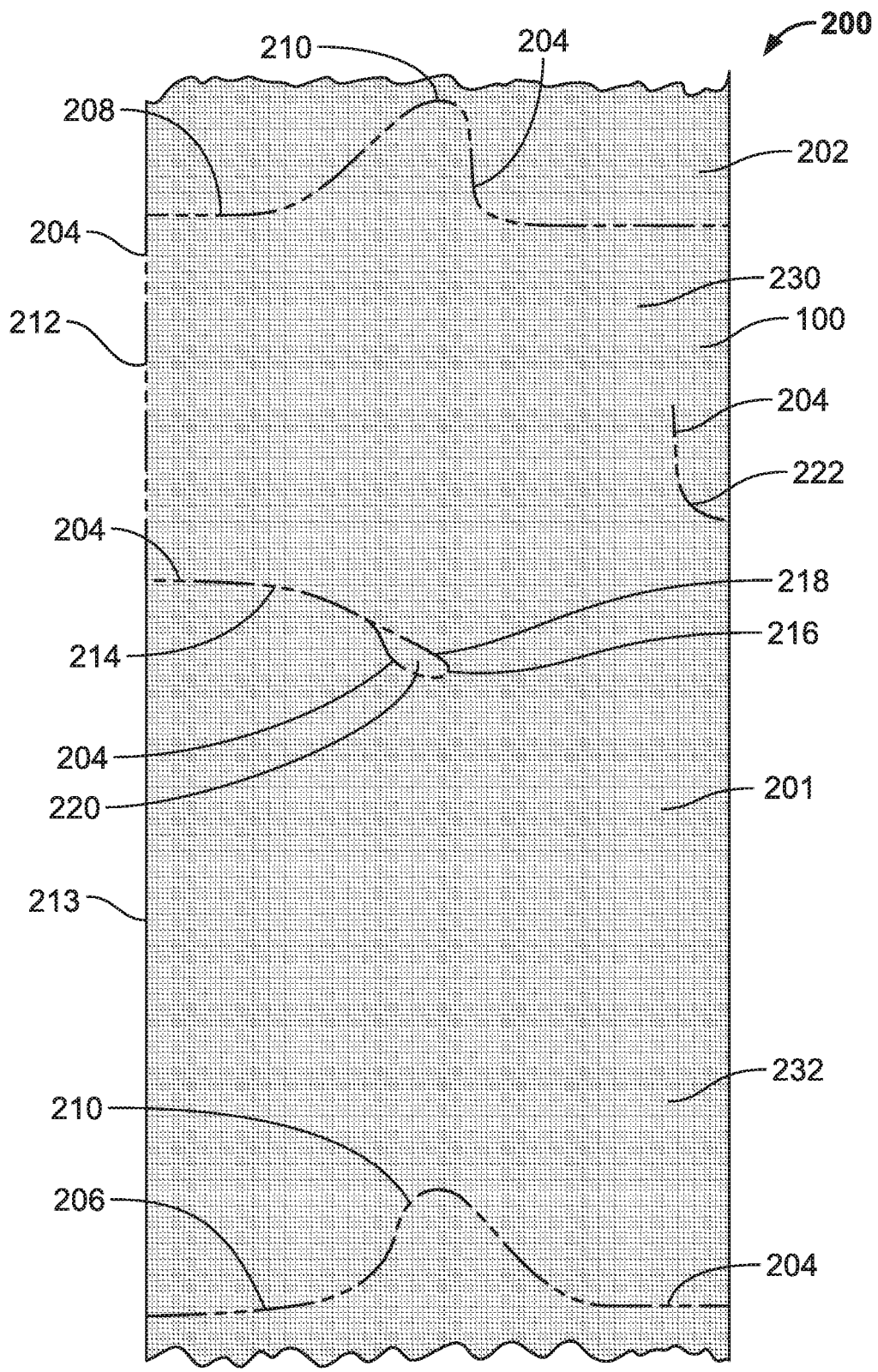
FIG. 5 is a side view of a textile element laid flat with a plurality of cut lines marked thereon.
Figure 6:
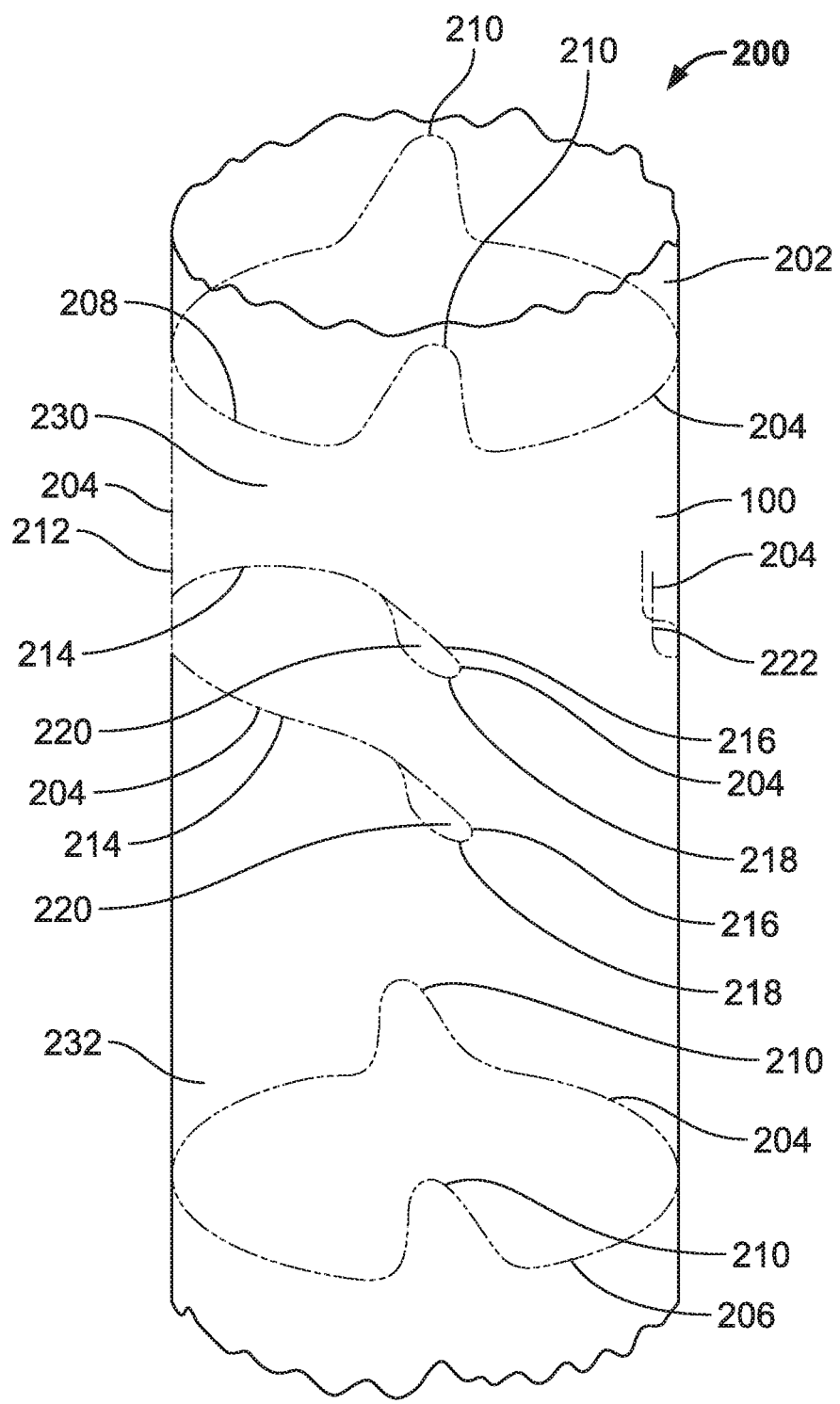
FIG. 6 is a perspective view of the textile element of FIG. 5 unfolded into a tubular configuration.

Referring to FIGS. 5 and 6, a side view of a textile element 200 laid flat and a perspective view of the textile element 200 are shown, respectively. In other words, in the example of FIG. 5, the textile element 200 is in a flattened state 201. It should be appreciated that before the textile element 200 is cut to form the garment 100 of FIGS. 1-4, the textile element 200 is tubular. The textile element 200 is formed from a fabric material 202, and it is contemplated that the textile element 200 can be formed in any conventional style using any conventional fabric. For example, the textile element 200 may be formed from a circular knitting machine using interlock fabric. In alternative embodiments, the textile element 200 can be formed from a first flat textile structure and a second flat textile structure that are attached to each other to form a tube of fabric. In such an embodiment, the first flat textile structure and the second flat textile structure may comprise different fabric materials or patterns. It is contemplated that the first flat textile structure and the second flat textile structure can be formed in any conventional style and can be formed into the textile element 200 in any way known to one of ordinary skill in the art. In one embodiment, the continuous stitching line 140 (shown in FIGS. 1-4) is the only interior seam added to form the garment 100 after the textile element 200 is formed by the first flat textile structure and the second flat textile structure. In preferred embodiments, the textile element 200 has a predetermined length and diameter.

Referring still to FIGS. 5 and 6, the textile element 200 is a circularly formed fabric, i.e., circular knit fabric. As such, the textile element 200 is tubular, i.e., the textile element 200 includes two layers when laid flat (see FIG. 5). As illustrated in FIGS. 5 and 6, the textile element 200 includes a plurality of cut lines 204 (shown in dash-dot-dot-dash lines in FIGS. 5-7). The plurality of cut lines 204 are positioned strategically throughout the textile element 200 to form the garment 100. Further, the plurality of cut lines 204 are intended to extend through both layers of the textile element 200. Put differently, the plurality of cut lines 204 are cut when the textile element 200 is laid flat, i.e., the flattened state 201 (see FIG. 5). Therefore, when providing a plurality of cuts to the fabric material 202 of the textile element 200, the cuts extend through both layers of the textile element 200. As noted herein, solid lines indicate edges of the textile element 200 in a flattened state that remain uncut. Additionally, as illustrated in FIGS. 5 and 6, the dash-dot-dot-dash lines represent where cuts are placed on the textile element 200. In some embodiments, the plurality of cut lines 204 can be defined along the surface of the textile element 200 in any suitable manner that facilitates cutting the fabric material 202 along the plurality of cut lines 204 via any suitable automated or other process, e.g., providing printed indicia on the fabric surface, including printed boundary line portions, providing one or more alignment markings on the fabric surface that facilitates alignment of the fabric surface with a cutting device, providing a suitable alignment of the fabric surface with a die cutting machine, etc. In other embodiments, the plurality of cut lines 204 are visual cues (e.g., one or more projected laser dots and/or lines) to where the plurality of cuts will be taken and are not physically printed or defined on the textile element 200. In such embodiments, the plurality of cut lines 204 may be stored in the memory of an automated cutting machine.

Referring still to FIGS. 5 and 6, the cutting of the fabric material 202 of the textile element 200 can be done via an automated cutting process, a manual cutting process, and/or laser cutting process. In another example embodiment, a machine/die cutting process can be utilized, where a cutting machine makes the plurality of cuts along the plurality of cut lines 204. In such an example, a straight knife fabric cutting machine may be used. In alternative embodiments, an automatic steel stamp machine or a digital cutter may be used. It is contemplated that any type of automatic or manual cutting process may be implemented to provide the plurality of cuts to the fabric material 202 of the textile element 200.

Referring still to FIGS. 5 and 6, the plurality of cut lines 204 allow the textile element 200 to be cut in a particular way such that only one seam, the continuous stitching line 140, is needed to from the garment 100 of FIGS. 1-4. As noted herein, the textile element 200 and the plurality of cut lines 204 are not to scale and may be altered in various embodiments. As illustrated in FIGS. 5 and 6, the textile element 200 includes a first cut line 206 and a second cut line 208. In one embodiment, the first and second cut lines 206, 208 comprise a generally linear pattern with a wave pattern 210 situated generally at the middle of the first and second cut lines 206, 208. The first cut line 206 defines the bottom end 116 of the torso portion 102, and the wave pattern 210 in the first cut line 206 creates the lateral hip cutouts 150 in the garment 100 (see FIGS. 1 and 2). As will become apparent upon further discussion herein, the second cut line 208 defines the free edge 146 (see FIGS. 8-10) of the yoke portion 104.

Referring to FIGS. 5 and 6, a third cut line 212 is illustrated extending perpendicular from the second cut line 208. In one embodiment, the third cut line 212 runs along an edge 213 of the textile element 200 in the flattened state 201 (see FIG. 5). Therefore, the third cut line 212 cuts through one layer of the fabric material 202 as opposed to first and second cut lines 206, 208 that extend through both layers of the textile element 200. The third cut line 212 creates the distal ends 114 of the arm sleeves 106, 108 that form the armholes 110, 112 (see FIGS. 1 and 2). As illustrated in FIG. 5, the third cut line 212 extends substantially straight or vertical along the edge 213 of the textile element 200 between the second cut line 208 and a fourth cut line 214.

Referring still to FIGS. 5 and 6, in one example, the fourth cut line 214 has an arch shaped profile that extends into the middle of the textile element 200. The fourth cut line 214 terminates at a fifth cut line 216 generally defined between the wave patterns 210 of the first and second cut lines 206, 208. In one embodiment, the fifth cut line 216 forms a loop 218 around a segment 220 of the fabric material 202. As such, both sides of the loop 218 are in contact with the fourth cut line 214 such that the segment 220 of the fabric material 202 is completely enclosed by the fifth cut line 216. Once the fifth cut line 216 has been cut, the segment 220 of the fabric material 202 surrounded by the fifth cut line 216 is removed from the textile element 200. Since the textile element 200 comprises two layers of fabric material 202, two segments 220 of the fabric material 202 are removed from the textile element 200 after the fourth cut line 214 and the fifth cut line 216 have been cut. As will become more apparent upon further discussion herein, the segments 220 of the fabric material 202 are the only portions of the fabric material 202 that are removed from the textile element 200 during the formation of the garment 100. Therefore, the plurality of cut lines 204 substantially minimize waste during the formation of the garment 100. As noted herein, the fourth cut line 214 and the fifth cut line 216 define the bottom edge 122 (see FIG. 1) of the first and second arm sleeves 106, 108 and the back top edge 120 (see FIG. 2) of the torso portion 102 of the garment 100.

Referring still to FIGS. 5 and 6, a sixth cut line 222 is positioned on the opposite edge from the third cut line 212. In one embodiment, the sixth cut line 222 comprises a generally J-type shape extending from the edge of the textile element 200 and up towards the second cut line 208. The sixth cut line 222 forms the neck opening 124 in the garment 100 (see FIGS. 1 and 2). It should be understood that the sixth cut line 222 may be of any size or shape. Thus, the sixth cut line 222 may provide different neck designs, for example, a V-neck design or a crew neck design. Depending on the size and dimensions needed to form the garment 100, the size and orientation of all of the plurality of cut lines 204 may be modified.

Referring to FIG. 6, the textile element 200 is shown in a 3-D or unfolded state. As illustrated in FIG. 6, the plurality of cut lines 204 are shown on both sides of the textile element 200. As described above, the third cut line 212 extends through one layer of the fabric material 202. Further, as stated above, the segments 220 of the fabric material 202 are the only portions of the fabric material 202 that are removed from the textile element 200. Therefore, the garment 100 is produced from the textile element 200 with minimal waste. In some embodiments, once the textile element 200 has been cut, the plurality of cuts remove approximately 10% or less of the fabric material 202 from the single textile element 200. In preferred embodiments, the plurality of cuts may remove approximately 1% or less of the fabric material 202 from the textile element 200. In further embodiments, the plurality of cuts may remove approximately 0.1% or less of the fabric material 202 from the textile element 200. Therefore, approximately as much as 90% or greater of the fabric material 202 from the textile element 200 is used to form the garment 100.

Figure 7:
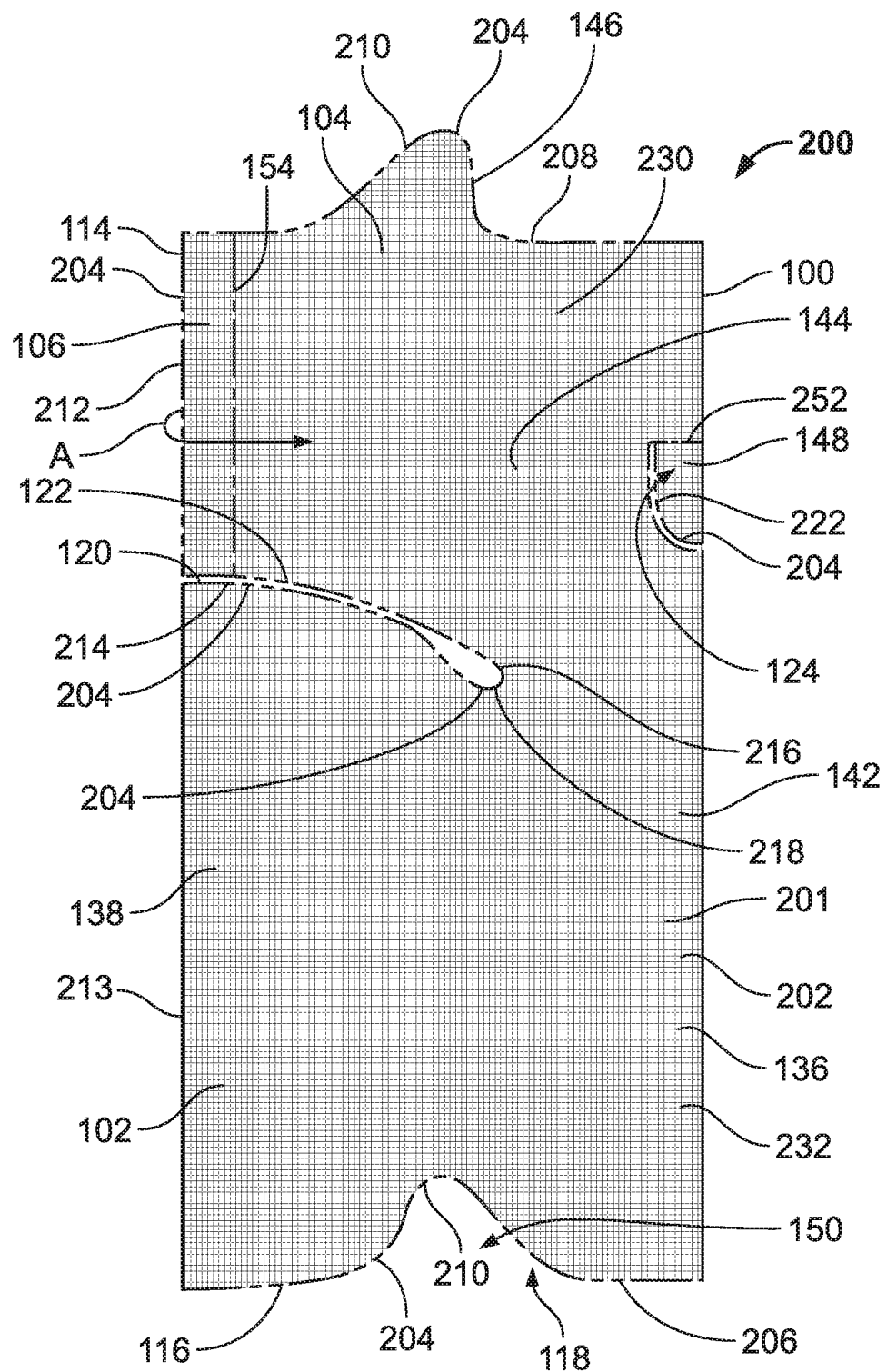
FIG. 7 is a side view of the textile element of FIGS. 5 and 6 after the plurality of cut lines have been cut.

Referring to FIG. 7, a side view of the textile element 200 is shown after the plurality of cut lines 204 have been cut. The lines marked as dash-dot-dot-dash lines represent lines in the textile element 200 that have been cut by the cutting process. After the plurality of cuts have been taken, the textile element 200 is ready to be unfolded. As a result of the third cut line 212, the fourth cut line 214, and the fifth cut line 216, an upper portion 230 of the textile element 200 can be opened in the direction of arrow A. In preferred embodiments, the upper portion 230 forms the yoke portion 104 (see FIGS. 1 and 2). Since the third cut line 212 extends through one layer of the fabric material 202, the textile element 200 is able to unfold into a T-shape (see FIG. 8).

Figure 8:
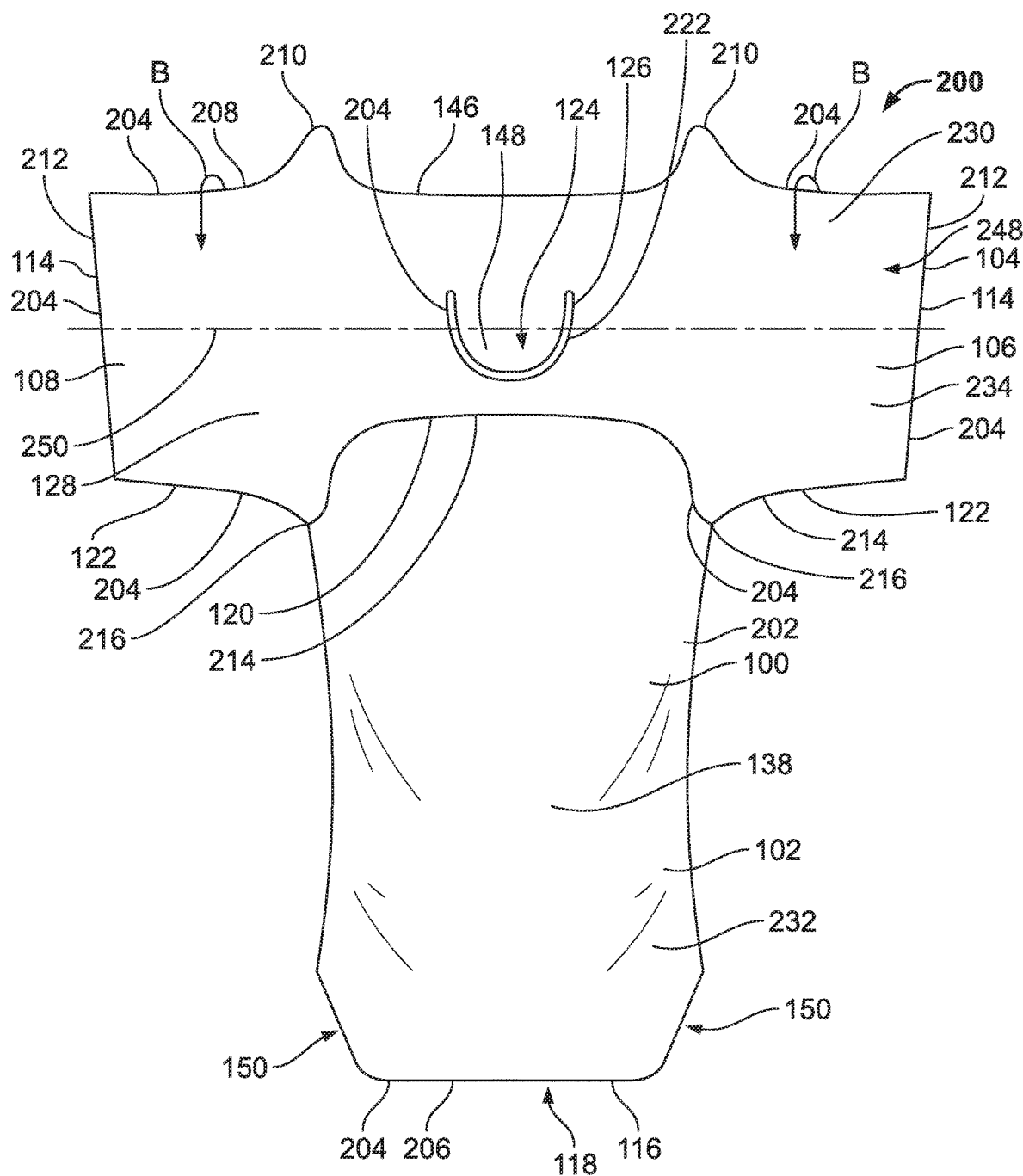
FIG. 8 is a rear view of the textile element of FIGS. 5-7 unfolded into a T-shape.

Referring to FIG. 8, a rear view of the textile element 200, i.e., the back 138 of the garment 100, unfolded into a T-shape is shown. As noted herein, all structural lines, including the plurality of cut lines 204, are marked as solid lines in FIGS. 8-11 to improve clarity. As illustrated in FIG. 8, the torso portion 102 of the garment 100 is illustrated at a bottom portion 232 of the textile element 200. After the plurality of cuts have been taken, the bottom portion 232 of the textile element 200 still comprises a closed configuration, i.e., tube shape. That is, because of the tubular construction of the textile element 200, the torso portion 102 is already formed without the need for any seams or stitching. As such, after the plurality of cuts have been taken, the entire torso portion 102, including the torso opening 118 is already formed. Additionally, after the textile element 200 is unfolded into a T-shape (see FIG. 8), the yoke portion 104 of the garment 100 can be shown in an open state 234. As a result, the first arm sleeve 106 and the second arm sleeve 108 are shown in an open configuration. In other words, when the yoke portion 104 is in the open state 234, the armholes 110, 112 are not formed. Additionally, as illustrated in FIG. 8, the yoke portion 104 forms an open channel 248 along a folding axis 250. Further, the folding axis 250 intersects the sixth cut line 222. In some embodiments, the sixth cut line 222 forms the neck opening 124 and the flap 148 in the garment 100.

Referring still to FIG. 8 and as discussed above, the upper portion 230 of the textile element 200 defines the yoke portion 104 of the garment 100. Put differently, the upper portion 230 of the textile element 200 is the same as the yoke portion 104 of the garment 100. As such, the upper portion 230 of the textile element 200 comprises the free edge 146 of the yoke portion 104 that is configured to attach with the back top edge 120 of the torso portion 102. As illustrated in FIG. 8, the back top edge 120 of the torso portion 102 comprises a generally plateau shape that intersects with the bottom edge 122 of the arm sleeves 106, 108 created by the fourth cut line 214. In order to form the garment 100, the upper portion 230 of the textile element 200 is folded along the folding axis 250 in the direction of arrows B toward the back top edge 120 of the torso portion 102.

Figure 9:
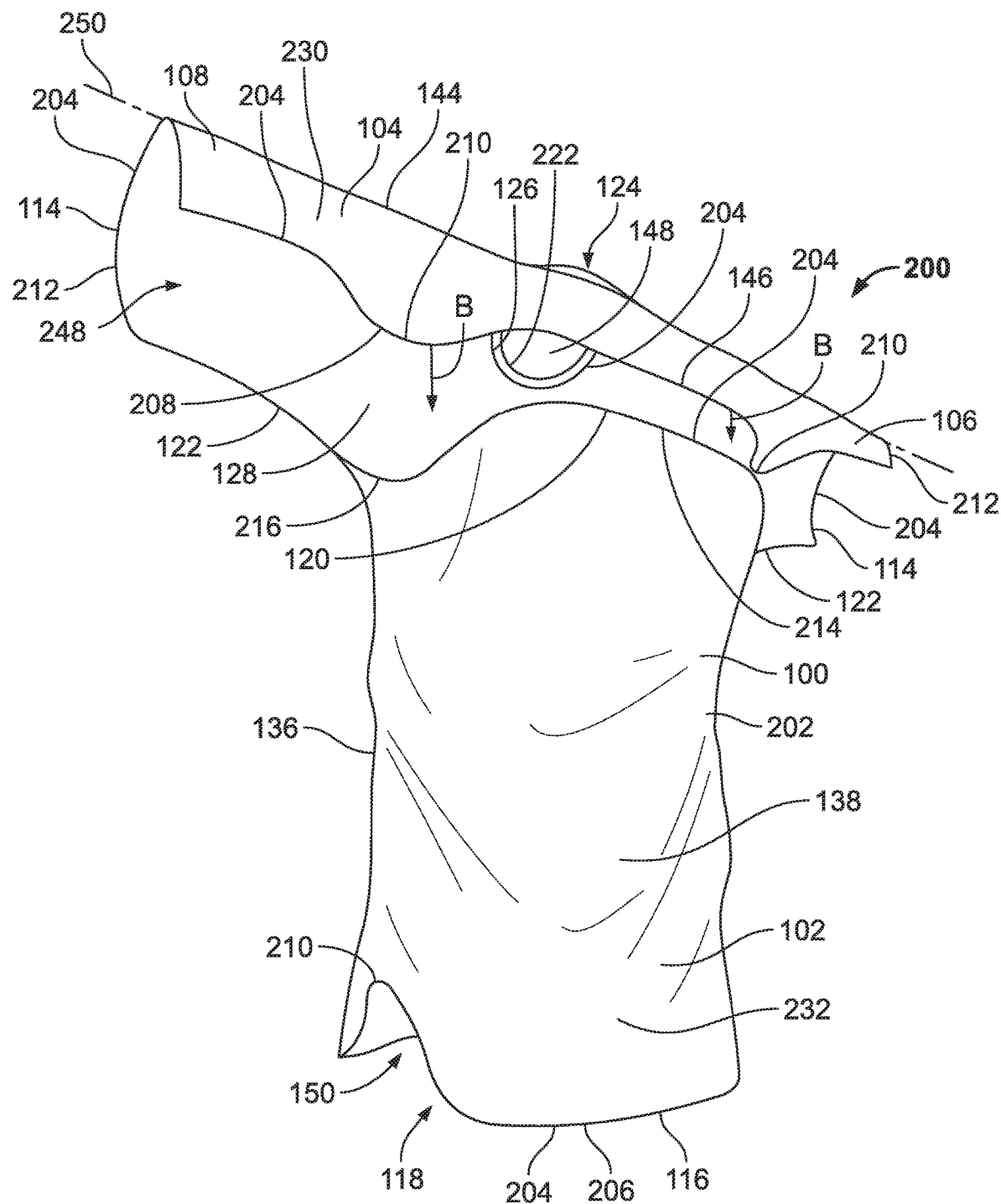
FIG. 9 is a perspective view of the textile element of FIGS. 5-8 partially folded.
Figure 10:
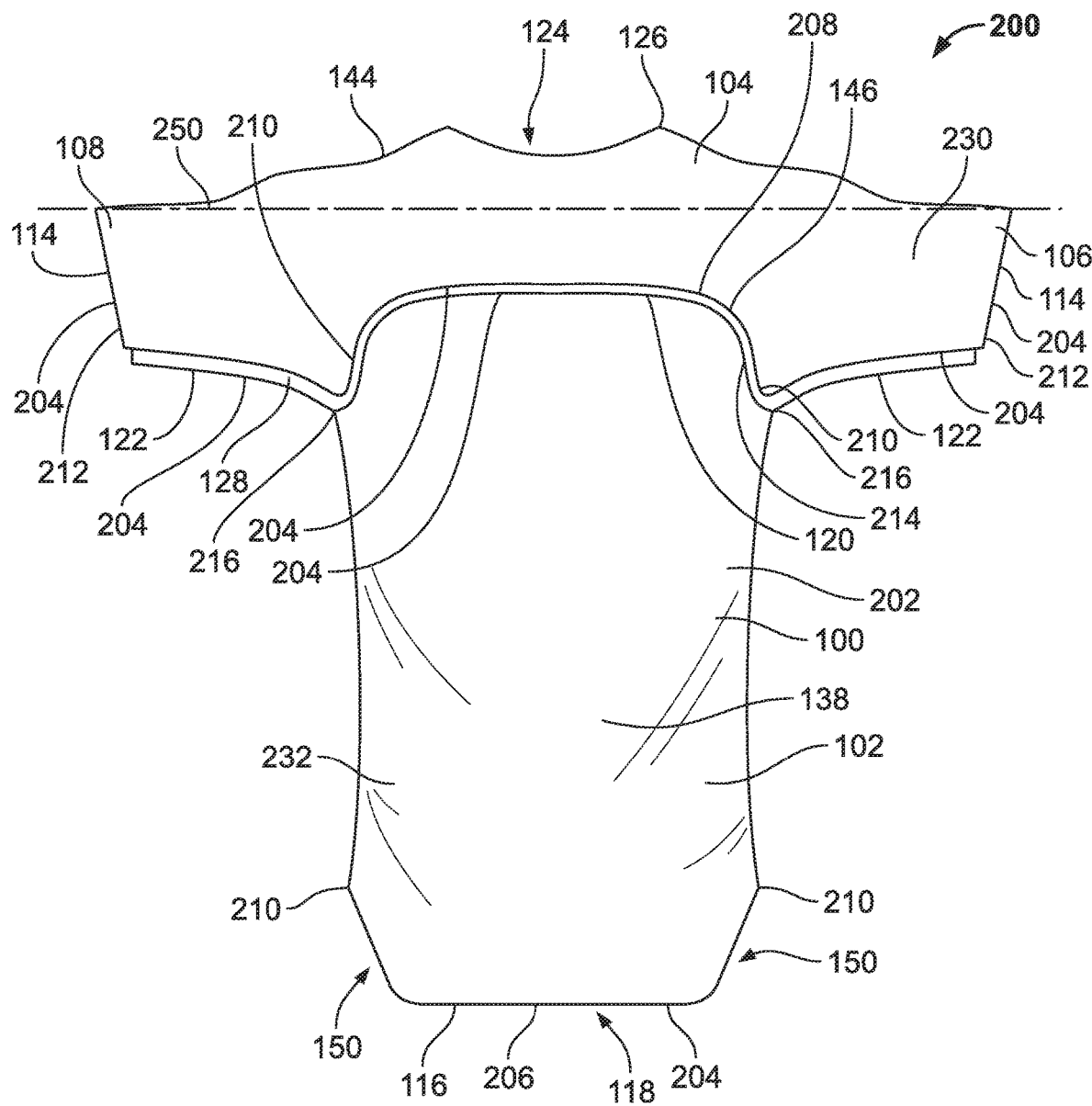
FIG. 10 is a rear view of the textile element of FIGS. 5-9 folded into the garment of FIGS. 1-4.

Referring to FIGS. 9 and 10, a perspective view of the textile element 200 partially folded and a rear view of the textile element 200 folded into the garment 100 are shown, respectively. As illustrated in FIG. 9, the upper portion 230 of the textile element 200 is partially folded along the folding axis 250. As the upper portion 230 of the textile element 200 continues to be folded in the direction of the arrows B, the free edge 146 of the yoke portion 104 begins to align with the back top edge 120 of the torso portion 102. Specifically, the wave patterns 210 created by the second cut line 208 are configured to fit and align with a portion of the back top edge 120 of the torso portion 102 and the bottom edge 122 of the soon to be formed first and second arm sleeves 106, 108. More particularly, the wave patterns 210 created by the second cut line 208 align with portions of the fifth cut line 216 that removed the segments 220 of the fabric material 202 (see FIGS. 5 and 6). Since the segments 220 of the fabric material 202 have been removed, the wave patterns 210 on the free edge 146 of the yoke portion 104 can align properly with the back top edge 120 of the torso portion 102. As the upper portion 230 of the textile element 200 continues to fold along the folding axis 250, the neck opening 124, created by the sixth cut line 222, moves in relation with the yoke portion 104 to the top of the textile element 200.

Referring to FIG. 10, the upper portion 230 of the textile element 200 is completely folded along the folding axis 250. As such, the free edge 146 of the yoke portion 104 is now adjacent to the back top edge 120 of the torso portion 102. Additionally, the joining of the upper portion 230 of the textile element 200 to the bottom edge 122 of the arm sleeves 106, 108, now forms the first and second arm sleeves 106, 108. Once the free edge 146 of the yoke portion 104 is in contact with the back top edge 120 of the torso portion 102, the two edges are sewn together to form the continuous stitching line 140, which completes the transformation of the textile element 200 into the garment 100 (see FIG. 11).

Figure 11:
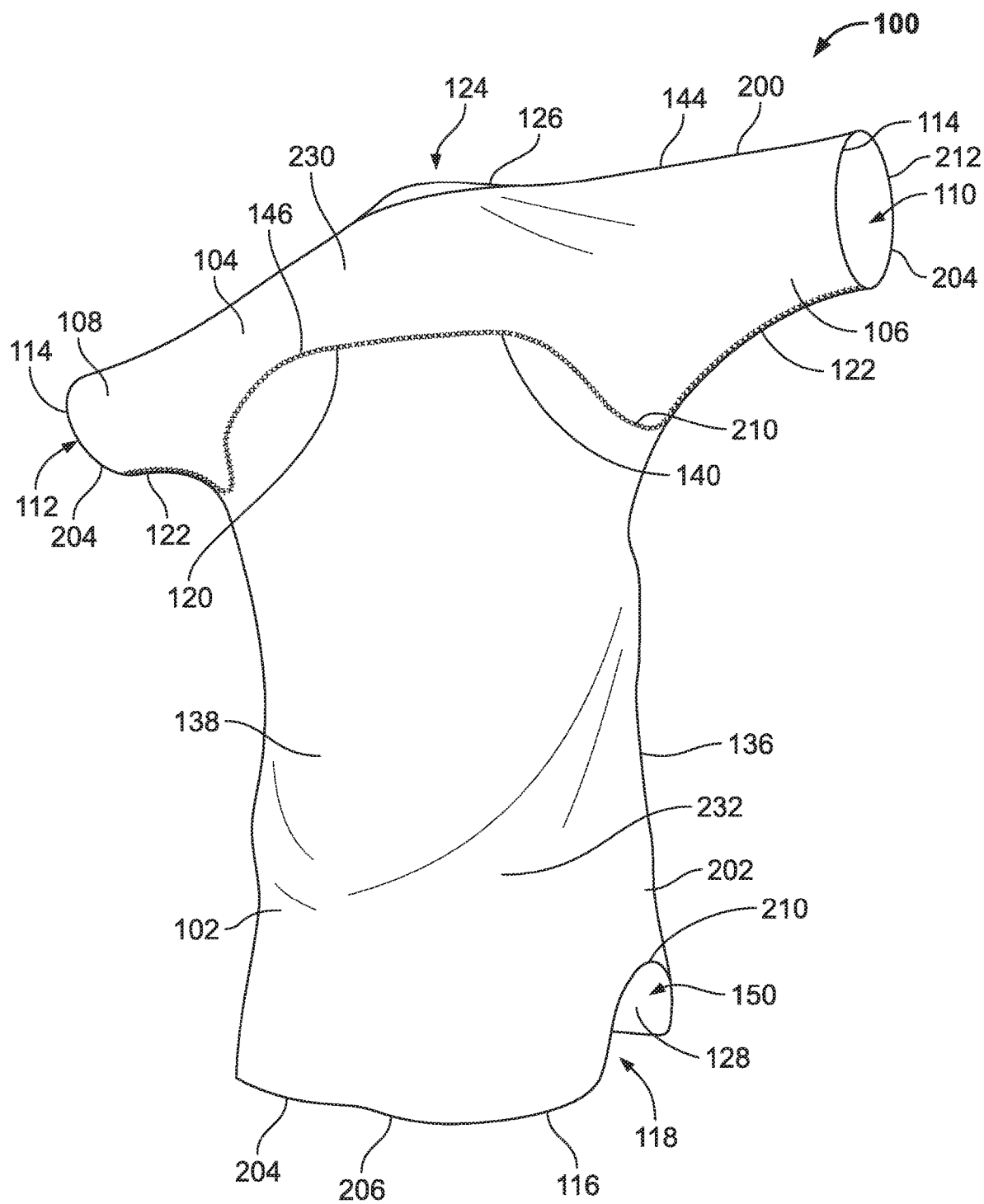
FIG. 11 is a perspective view of the textile element of FIGS. 5-10 formed into the garment of FIGS. 1-4 by a continuous stitching line.

Referring to FIG. 11, a perspective view of the textile element 200 formed into the garment 100 by the continuous stitching line 140 is shown. As illustrated in FIG. 11, the continuous stitching line 140 runs along the garment 100, connecting the free edge 146 of the yoke portion 104 to the back top edge 120 of the torso portion 102. Put differently, the garment 100 is sewn together along the continuous stitching line 140. Additionally, the first and second arm sleeves 106, 108 are formed by the continuous stitching line 140. As described above, the continuous stitching line 140 is the only seam in the garment 100 required to fashion the garment 100. Further, the continuous stitching line 140 encloses the back 138 of the garment 100. Thus, as mentioned above, the garment 100 defines the neck opening 124, the two armholes 110, 112, and the torso opening 118. In some embodiments, the garment 100 covers an upper portion of the wearer during use. In some embodiments, the continuous stitching line 140 is a merrow seam. However, it should be understood that the continuous stitching line 140 may be any type of seam.

Once the garment 100 has been formed and the single continuous stitching line 140 has been sewn on, a graphic may be added to the garment 100. As described above and illustrated in FIG. 1, the logo 152 may be added to the garment 100 at this time. In alternative embodiments, the logo 152 may be added to a chest or yolk pocket on the garment 100. In some embodiments, the logo 152 may be printed or attached to the textile element 200 before the plurality of cuts are made to the textile element 200 (see FIG. 5). In other embodiments, the graphic or pocket may be sewn to the garment 100 in an additional stitching step.

As described herein, the continuous stitching line 140 is the only interior seam used to form the garment 100. However, additional stitching steps may be employed for decorative elements such as graphics, logos, pockets, etc., as noted above, which are separate from the creation of the functional garment 100 itself. Further, it is also anticipated that the garments 100 may use decorative stitching, a seam, or a hem along the distal ends 114 of the first and second arm sleeves 106, 108, the collar 126, and the end 116 of the torso portion 102 to avoid the garment 100 from fraying and/or as a decorative element.

Referring to FIGS. 7 and 8, the neck opening 124 is formed by the sixth cut line 222. Once the sixth cut line 222 has been cut, the flap 148 is produced. Once the garment 100 has been formed from the textile element 200, the flap 148 can be folded back along a fold line 252 and attached or stitched to the interior portion 128 of the garment 100 (see FIGS. 1 and 7). As illustrated in FIG. 1, in some embodiments, a label or tab may be printed on the flap 148 once it has been attached to the interior portion 128 of the garment 100. It is contemplated that the flap 148 may be attached to the interior portion 128 of the garment 100 in any conventional manner. As a result, the flap 148 produces a reinforced area of fabric for the label to be printed on and the flap 148 reduces waste when producing the garment 100. In some embodiments, the flap 148 may be attached to the interior portion 128 of the garment 100 immediately after the plurality of cut lines 204 have been cut (see FIG. 7).

Referring to FIG. 11, the garment 100 is shown configured from the textile element 200. As discussed above, the garment 100 is produced from the textile element 200 of the fabric material 202 and comprises one continuous stitching line 140 that forms and encloses the garment 100 around the wearer. In the present embodiment, the garment 100 is shown as a T-shirt or short sleeve shirt. However, in alternative embodiments, the garment 100 may be a long sleeve shirt. In such an embodiment, additional tubular pieces of fabric may be added to the garment 100. For example, an additional tubular textile element can be attached to each of the distal ends 114 of the first arm sleeve 106 and the second arm sleeve 108. Therefore, in total, two additional tubular textile elements would be attached to the garment 100. The additional tubular textile elements would comprise a similar diameter as the armholes 110, 112 on the arm sleeves 106, 108. It is contemplated that the additional tubular textile elements can be attached to the distal ends 114 of the first arm sleeve 106 and the second arm sleeve 108 in any conventional manner. For example, the additional tubular textile elements may be attached by stitching along one or more additional seams, causing the garment 100 to have at least three seams in total. In some embodiments, the additional tubular textile elements may be removably attached to the distal ends 114 of the first arm sleeve 106 and the second arm sleeve 108. For example, a zipper or Velcro® may be used to attach the additional tubular textile elements to the first and second arm sleeves 106, 108.

As noted herein, the additional tubular textile elements would not need to be altered or cut once they have been sized to the appropriate shape and length. Therefore, the additional tubular textile elements do not create any additional waste to the garment making process described herein. In alternative embodiments, the additional tubular textile elements may include a cuff or hem at the end, opposite to the side that is attached to the distal ends 114 of the first arm sleeve 106 and the second arm sleeve 108. In further embodiments, the additional tubular textile elements may comprise the same or a different fabric or material than the rest of the garment 100.

Figure 12:
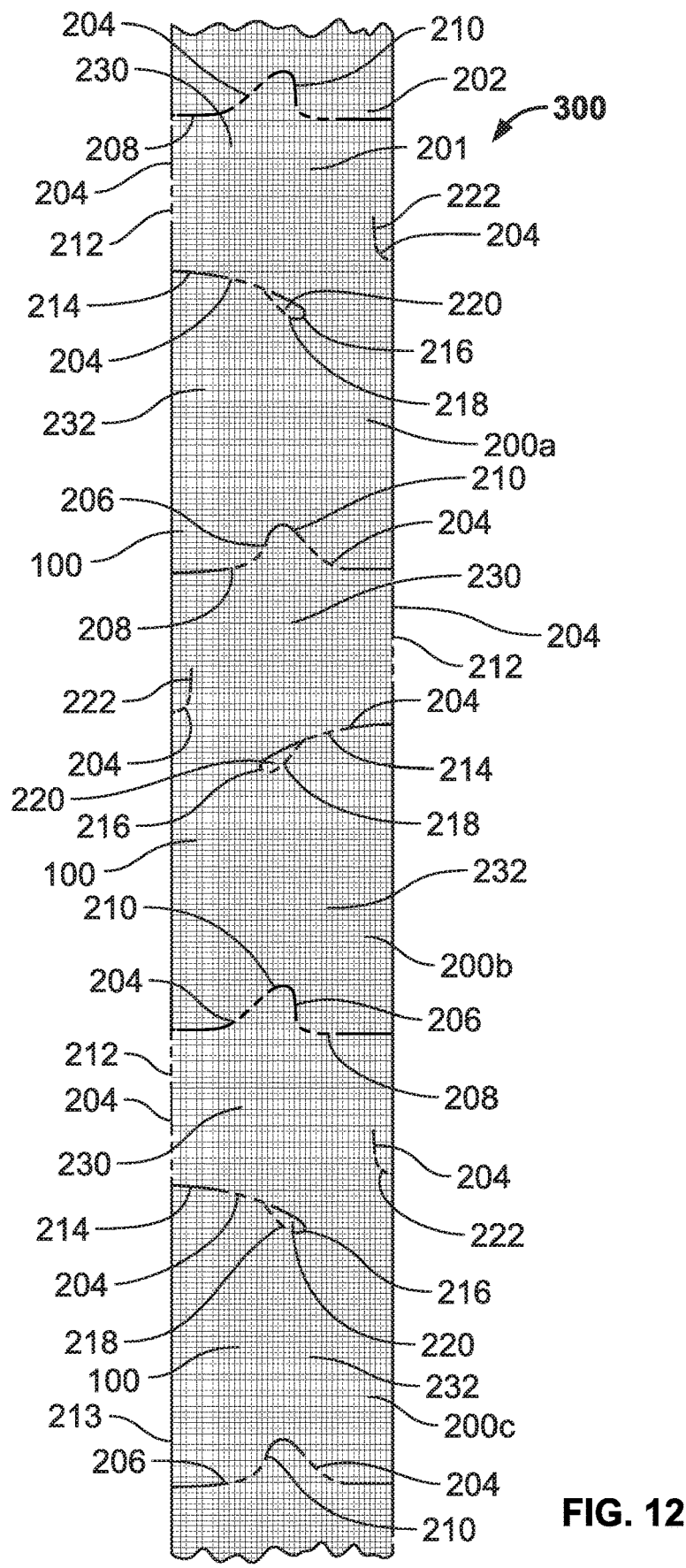
FIG. 12 is an expanded side view of a textile source stream of the textile element of FIGS. 5-11 laid flat with a plurality of cut lines marked thereon to produce a plurality of the garments of FIGS. 1-4.

Referring to FIG. 12, an expanded side view of a textile source stream or textile element 300 comprising a plurality of textile elements 200a, 200b, 200c is shown. As illustrated in FIG. 12, multiple textile elements 200a, 200b, 200c may be formed or produced from the single textile source stream 300. Each of the textile elements 200a, 200b, 200c comprise the same components as the garment 100 and the same plurality of cut lines 204 as described above. However, each of the textile elements 200a, 200b, 200c can share some of the plurality of cut lines 204 such that when one cut is taken through the textile source stream 300, multiple textile elements 200a, 200b, 200c can receive the single cut. Put differently, at least one of the plurality of cuts to the textile element 200a, i.e., first cut line 206, precuts a portion of a subsequent textile element 200b, i.e., second cut line 208. As such, each of the textile elements 200a, 200b, 200c share the first and second cut lines 206, 208. Therefore, for example, the first cut line 206 in the textile element 200a becomes the second cut line 208 in the next textile element 200b along the textile source stream 300 and so on. Thus, during production, only one of the first or second cut lines 206, 208 needs to be cut for each of the textile elements 200a, 200b, 200c since the previous textile element 200a, 200b, 200c provided the other first or second cut line 206, 208.

Referring still to FIG. 12, the plurality of cut lines 204 of each of the textile elements 200a, 200b, 200c are mirror images from any adjacent textile elements 200a, 200b, 200c. For example, the plurality of cut lines 204 for textile element 200b are opposite and a mirror image from the textile element 200a and the textile element 200c. This mirror image pattern allows the textile elements 200a, 200b, 200c to share the first and second cut lines 206, 208 described above. As a result, during production, the plurality of cut lines 204 are minimized to increase the efficiency and speed of the garment making process while minimizing any waste from the textile source stream 300. Therefore, the plurality of textile elements 200a, 200b, 200c may be produced from one textile source stream 300 where only approximately 10% or less of the fabric is removed from the textile source stream 300. In some embodiments, more or fewer textile elements 200a, 200b, 200c may be produced from the textile source stream 300 than shown in FIG. 12. For example, the longer the textile source stream 300, the more textile elements 200a, 200b, 200c that can be produced into the garment 100. As noted herein, each of the textile elements 200a, 200b, 200c may produce the same garment 100 of FIGS. 1-4.

Figure 13:
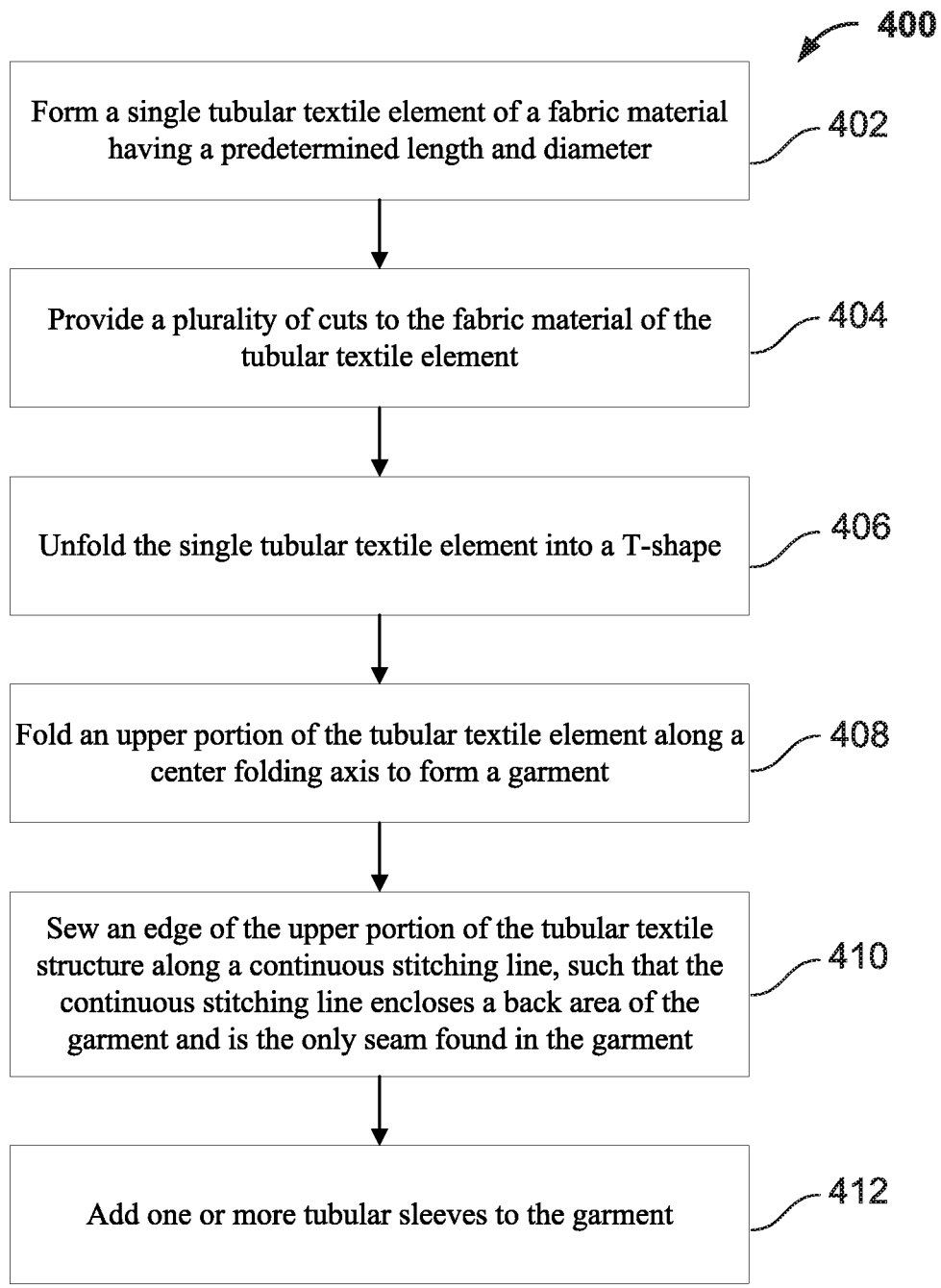
FIG. 13 is a flowchart depicting an example process for forming the garment of FIGS. 1-4.

Referring to FIG. 13, a flowchart outlining the steps of a process 400 for forming the garment 100 illustrated in FIGS. 1-4 and outlined above is shown, according to one example. In this example embodiment, the textile element 200 is formed, and the textile element 200 is used to form the garment 100 (see FIGS. 5-11). While the example process is described with reference to the flowchart illustrated in FIG. 13, many other methods of forming the garment 100 may alternatively be used. For example, the order of execution of the blocks may be rearranged, changed, eliminated, and/or combined to perform the process 400.

As described above, the textile element 200 may be formed from a weaving or nonwoven processes, as shown in FIG. 5. Further, in alternative embodiments, the textile element 200 may be formed from two flat textile structures that are attached or secured to each other. At step 402, a tubular textile/knit element, i.e., the textile element 200, is formed from a fabric material, i.e., the fabric material 202, having a predetermined diameter via any suitable circular knit process, e.g., a circular knitting machine (see FIGS. 5 and 6). The diameter is chosen depending on the amount and the size of the garments 100 needed. In preferred embodiments and as illustrated in FIG. 12, the textile element 200 is formed from the textile source stream 300, and the textile source stream 300 may have a pre-determined length. In alternative embodiments, the textile source stream 300 may be formed and cut in a continuous process along an assembly line. As illustrated in FIG. 11, during the process of forming the textile element 200 of the fabric material 202, strands of different colors or properties may be combined to form the garment 100 with various appearances or properties. For example, the front 136 of the garment 100 and the back 138 of the garment 100 may comprise different colors or types of fabric. In some embodiments, the yoke portion 104 of the garment 100 may also differ in appearance or type of fabric from the torso portion 102. In further embodiments, after the textile element 200 has been formed, the textile element 200 may be decorated using heat transfer, screen printing, or embroideries.

Referring to FIGS. 5, 6, and 13, at step 404, a plurality of cuts are made to the fabric material 202 of the textile element 200. As described above, the fabric material 202 may be cut by any conventional process such as by a straight knife fabric cutting machine, an automatic steel stamp, or a digital cutter. As outlined above and shown in FIGS. 5 and 6, the plurality of cuts are taken along the plurality of cut lines 204. As mentioned above, in some embodiments, the plurality of cut lines 204 may be printed or defined in any other suitable manner along the fabric material 202 of the textile element 200. In other embodiments, the plurality of cut lines 204 are just a visual cue to where the plurality of cuts will be taken. In preferred embodiments, after the plurality of cuts have been taken, approximately 1% or less of the fabric material 202, i.e., the segments 220, is removed from the textile element 200 (see FIG. 7).

Referring to FIGS. 7, 8, and 13, at step 406, the textile element 200 is unfolded into a T-shape (see FIG. 8). As described above, the third cut line 212, the second cut line 208, and the fourth cut line 214 allow the textile element 200 to be unfolded into the T-shape. Specifically, the third cut line 212 allows for the upper portion 230 of the textile element 200 to be unfolded into a flat fabric element. It is contemplated herein that the textile element 200 may be unfolded in any conventional manner.

Referring to FIGS. 8-10 and 13, at step 408, the upper portion 230 of the textile element 200 is folded down along the center folding axis 250 to form the garment 100. At step 410, the free edge 146 of the torso portion 102 is sewn along the continuous stitching line 140 to complete the forming of the garment 100 (see FIG. 11). In particular, at the step 410, the free edge 146 of the torso portion 102 is sewn to the back top edge 120 of the torso portion 102. As illustrated in FIG. 11 and described above, the continuous stitching line 140 is the only seam required to form the garment 100, and the continuous stitching line 140 encloses the back 138 of the garment 100. That is, the fabric material 202 does not define any holes or openings in the back 138 of the garment 100. As such, the free edge 146 of the yoke portion 104 is attached to the back top edge 120 of the torso portion 102. The continuous stitching line 140 runs along the front 136 and the back 138 of the garment 100 and may be sewn in a wave pattern or S-shaped configuration. Once the continuous stitching line 140 is installed on the garment 100, the garment 100 is completed. However, in some embodiments, the garment 100 may be finished with some exterior hems along the distal ends 114 of the first and second arm sleeves 106, 108 and around the neck opening 124 and the torso opening 118 of the garment 100. Further, as described above, a cuff may be produced in the first and second arm sleeves 106, 108.

Once the continuous stitching line 140 is sewn into the garment 100, the flap 148 created by the sixth cut line 222 may be attached to the interior portion 128 of the garment 100 (see FIGS. 1 and 8). Further, in some embodiments, after step 410, a step of adding a graphic to the garment 100 may be conducted. Furthermore, depending on the style of the garment 100, at step 412, one or more tubular sleeves can be added to the garment 100. For example, additional tubular elements or sleeves may be attached to the first and second arm sleeves 106, 108 to form a long sleeve garment. As illustrated in FIG. 12, the process 400 outlined above may be implemented in mass production. Therefore, a plurality of garments 100 may be produced from the single textile source stream 300. As such, the process 400 results in an efficient and sustainable production method for manufacturing a plurality of articles of apparel that minimize waste.

Figure 14:
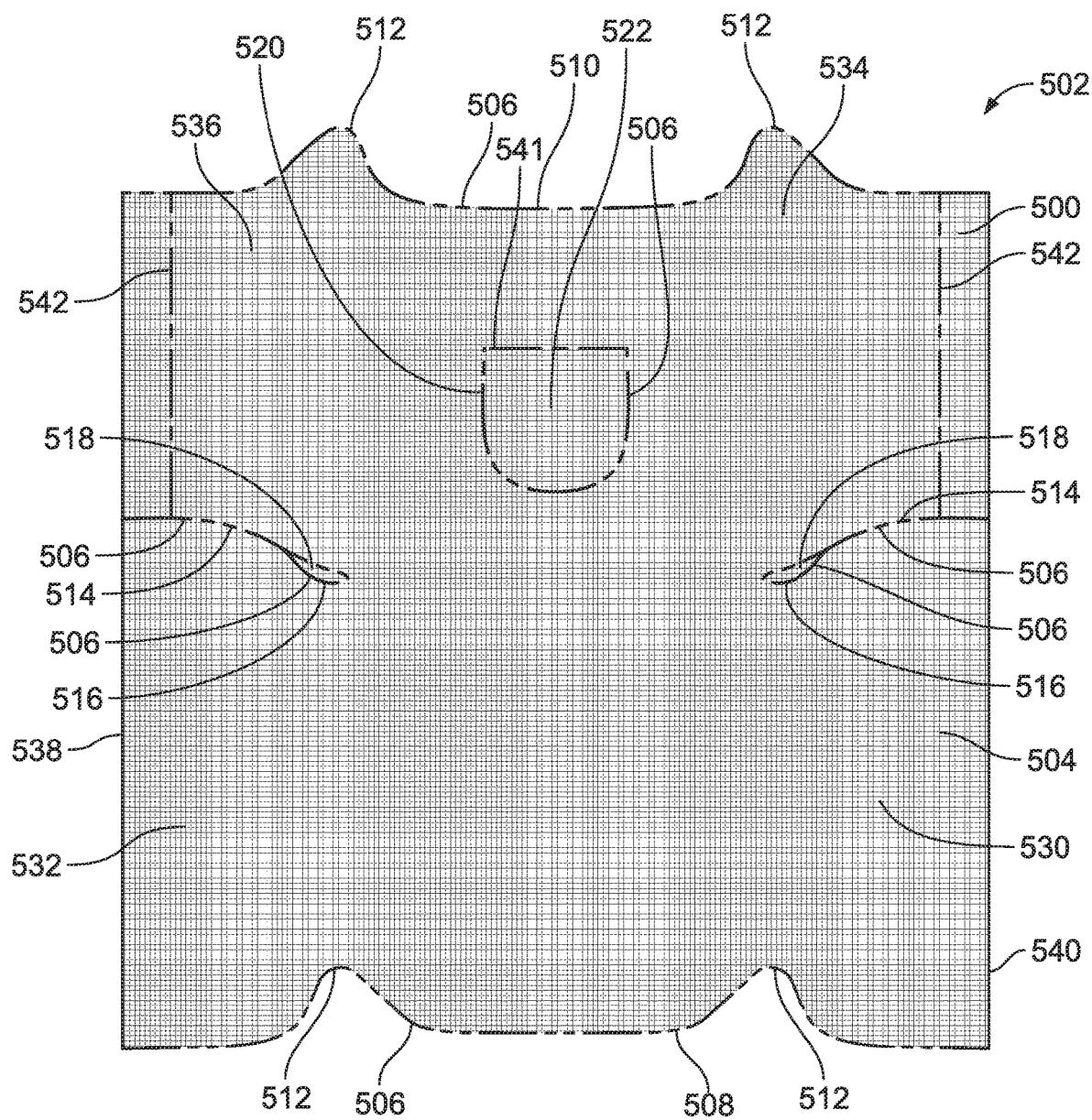
FIG. 14 is a front view of another embodiment of a textile element with a plurality of cut lines.

Referring to FIG. 14, an alternative embodiment for producing a garment 500 is shown. As illustrated in FIG. 14, the garment 500 is formed from a textile element 502. In the example of FIG. 14, the textile element 502 is laid flat. In this embodiment, a flat textile element 502 is initially used instead of a tubular element, e.g., the textile element 200. The textile element 502 is made up of a fabric material 504.

In some embodiments, the textile element 502 may comprise more than one fabric material throughout. For example, the textile element 502 may be formed from multiple fabric materials that are split up in quarters. As such, the textile element 502 can comprise four different types of materials. In some embodiments, the textile element 502 can be made up of any number of multiple fabric materials. Therefore, the flat configuration of the textile element 502 makes it easy to add or subtract different types of material to the garment 500.

Referring still to FIG. 14, once the textile element 502 is formed from one or more fabric materials 504, then the textile element 502 can be cut. Similar to the embodiment above, the flat textile element 502 comprises a plurality of cut lines 506 throughout that are similar in shape and style to the plurality of cut lines 204 taken in the textile element 200 (see FIG. 5). As illustrated in FIG. 14, the textile element 502 comprises a first cut line 508 and a second cut line 510. In this embodiment, each of the first and second cut lines 508, 510 comprise two wave patterns 512 protruding outwardly/inwardly therefrom.

Similar to the textile element 200, the textile element 502 may be formed from a long sheet of flat material (see FIG. 12). In such an embodiment, the first cut line 508 and the second cut line 510 may share the same cut line and be produced from a single cut. As illustrated in FIG. 14, the textile element 502 includes a third cut line 514 and a fourth cut line 516 positioned on both sides of the textile element 502. Similar to the textile element 200 shown in FIG. 7, segments 518 may be removed from the flat textile element 502 as a result of the forth cut lines 516. Further, the textile element 502 includes a fifth cut line 520 that is positioned generally in the middle of the flat textile element 502, above the third cut lines 514 and the fourth cut lines 516. The fifth cut line 520 produces a flap 522 in the flat textile element 502 similar to the flap 148 produced in the textile element 200 (see FIG. 7). Similar to the embodiments above, the plurality of cut lines 506 break up the flat textile element 502 into a bottom portion 530 of textile element 502, i.e., a torso portion 532, and an upper portion 534 of flat textile element 502, i.e., a yoke portion 536.

Referring still to FIG. 14, once the plurality of cut lines 506 have been cut, the flat textile element 502 is able to be folded into the garment 500. First, a left edge 538 and a right edge 540 of the textile element 502 are folded and attached or sewn to each other to form a tubular element in the bottom portion 530 of the textile element 502. As noted herein, the bottom portion 530 can be folded forward or backwards to form the tubular element. Once the left edge 538 and the right edge 540 are attached to each other, the torso portion 532 of the garment 500 is produced and the textile element 502 will have a similar configuration as the textile element 200 illustrated in FIG. 8. Further, after the torso portion 532 is formed into a tubular structure, the upper portion 534 of the textile element 502 can be folded down toward the bottom portion 530 in the same manner as described above with respect to FIGS. 8-11 and the garment 100. A continuous stitching line (not shown) can then be sewn to combine the upper portion 534 of the flat textile element 502 to the bottom portion 530 of the textile element 502. After the formation of the garment 500, the flap 522 may be folded along a fold line 541 and attached to a portion of the garment 500 similar with respect to the flap 148 of the garment 100 (see FIG. 7). As a result, the textile element 502 is formed into the garment 500 in a similar process as described above with respect to the textile element 200 and the garment 100 (see FIG. 11). As noted herein, the garment 500 has the same configuration and look as the garment 100 illustrated in FIGS. 1-4 except for the attachment area of the left edge 538 and the right edge 540 of the flat textile element 502.

Referring still to FIG. 14, the textile element 502 may be tailored to the body proportions of a wearer. For example, while the bottom portion 530 of the textile element 502 is being formed into a tube, the flat textile element 502 can be tailored depending on the fit of the garment 500. Therefore, the textile element 502 allows the shirt to be altered and tailored to improve the comfort and look of the garment 500 on the wearer. Further, since the textile element 502 may be formed from one or more fabrics, the design and look of the garment may differ from the front and back. In some embodiments, a cuff may be added onto the garment 500 along a fold line 542 similarly as described above with respect to the garment 100 (see FIG. 7). Additionally, tubular arm elements may be added to the garment 500 similarly as described above with respect to the garment 100 if a long sleeve garment is desired. Furthermore, a plurality of graphics or logos may be added to the flat textile element 502 or the garment 500.

Any of the embodiments described herein may be modified to include any of the structures or methodologies disclosed in connection with different embodiments. Similarly, materials or construction techniques other than those disclosed above may be substituted or added in some embodiments according to known approaches. Further, the present disclosure is not limited to articles of apparel of the type specifically shown. Still further, aspects of the articles of apparel of any of the embodiments disclosed herein may be modified to work with any type of apparel or athletic apparel.

As noted previously, it will be appreciated by those skilled in the art that while the disclosure has been described above in connection with particular embodiments, processes, and examples, the disclosure is not necessarily so limited, and that numerous other embodiments, processes, examples, uses, modifications and departures from the embodiments, processes, examples and uses are intended to be encompassed by the claims attached hereto.

What is claimed is:

1. A method for manufacturing an article of apparel from a fabric material, the method comprising:
    forming a single textile element of the fabric material, the single textile element being tubular;
    providing a plurality of cuts to the single textile element, which consist of all of the cuts made to the single textile element, wherein the plurality of cuts remove 10% or less of the fabric material from the single textile element;
    folding the single textile element; and
    sewing an edge of the single textile element along a single continuous stitching line to form the article of apparel, wherein the single continuous stitching line encloses a back of the article of apparel.

2. The method for manufacturing an article of apparel of claim 1, further comprising a step of adding a graphic to the article of apparel.

3. The method for manufacturing an article of apparel of claim 1, wherein the article of apparel is a garment for an upper body of a wearer, the garment comprising a first arm sleeve, a second arm sleeve, a front, and the back.

4. The method for manufacturing an article of apparel of claim 3, wherein the single continuous stitching line is positioned on the front and the back of the garment.

5. The method for manufacturing an article of apparel of claim 3, wherein the single continuous stitching line extends from the first arm sleeve to the second arm sleeve.

6. The method for manufacturing an article of apparel of claim 1, wherein the single continuous stitching line is sewn in a configuration that includes a convex portion and a concave portion.

7. The method for manufacturing an article of apparel of claim 1, wherein, after sewing the edge of the single textile element along the single continuous stitching line to form the article of apparel, the method further comprises a step of adding one or more tubular sleeves to first and second arm sleeves of the article of apparel to form a long sleeve article of apparel.

8. The method for manufacturing an article of apparel of claim 1, wherein multiple articles of apparel are formed from the single textile element.

9. The method for manufacturing an article of apparel of claim 8, wherein at least one of the plurality of cuts to the article of apparel precuts a portion of a subsequent article of apparel.

10. A method for manufacturing a garment from a fabric material, the method comprising:
    providing a single textile structure of the fabric material having a predetermined length and a predetermined diameter, the single textile structure being tubular;
    providing a plurality of cuts to the fabric material of the single textile structure;
    unfolding the single textile structure into a T-shape;
    folding an upper portion of the single textile structure along a center folding axis; and
    sewing an edge of the upper portion of the single textile structure along a continuous stitching line to form the garment, wherein the continuous stitching line encloses a back of the garment,
    wherein the continuous stitching line is the only seam to form the garment, and
    wherein the continuous stitching line is positioned on a front and the back of the garment.

11. The method for manufacturing a garment of claim 10, further comprising a step of adding a graphic to the garment.

12. The method for manufacturing a garment of claim 10, wherein the garment is a garment for an upper body of a wearer.

13. The method for manufacturing a garment of claim 10, wherein the garment defines a torso opening, a neck opening, and two armholes.

14. The method for manufacturing a garment of claim 13, wherein the torso opening, the neck opening, and the two armholes are the only openings in the garment that lead to an interior portion of the garment.

15. A method for manufacturing an article of apparel, the method comprising:
    forming a first flat textile structure;
    forming a second flat textile structure;
    forming a tubular textile structure from the first flat textile structure and the second flat textile structure;
    providing a plurality of cuts to the tubular textile structure;
    unfolding the tubular textile structure into a T-shape;
    folding an upper portion of the tubular textile structure along a center folding axis; and
    sewing an edge of the upper portion of the tubular textile structure along a continuous stitching line to form the article of apparel, wherein the continuous stitching line encloses a back of the article of apparel, wherein the continuous stitching line is the only seam added to form the article of apparel after the tubular textile structure has been formed, and wherein one of the plurality of cuts to the tubular textile structure defines a bottom end of a torso portion of the article of apparel and a free edge of a yoke portion of a subsequent article of apparel.

16. The method for manufacturing an article of apparel of claim 15, further comprising a step of adding a graphic to the article of apparel.

17. The method for manufacturing an article of apparel of claim 15, wherein the continuous stitching line is sewn in a configuration that includes a convex portion and a concave portion.

18. The method for manufacturing a garment of claim 10, wherein the diameter of the single textile structure is equal to a waist dimension of a torso portion of the garment.

19. The method for manufacturing a garment of claim 10, wherein the plurality of cuts remove 10% or less of the fabric material from the single textile structure.

20. The method for manufacturing an article of apparel of claim 15, wherein the plurality of cuts remove 10% or less of a fabric material of the tubular textile structure.

\* \* \* \* \*